United States Patent
Ishioka

(10) Patent No.: US 7,862,459 B2
(45) Date of Patent: Jan. 4, 2011

(54) TRANSMISSION, POWER UNIT HAVING THE SAME, VEHICLE, CONTROLLER FOR TRANSMISSION, AND METHOD OF CONTROLLING TRANSMISSION

(75) Inventor: Kazutoshi Ishioka, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 469 days.

(21) Appl. No.: 12/051,705

(22) Filed: Mar. 19, 2008

(65) Prior Publication Data

US 2008/0242459 A1 Oct. 2, 2008

(30) Foreign Application Priority Data

Mar. 20, 2007 (JP) ............................. 2007-072359
Oct. 25, 2007 (JP) ............................. 2007-277114

(51) Int. Cl.
*F16H 9/00* (2006.01)

(52) U.S. Cl. ............................. 474/70; 474/28; 701/51; 180/366; 477/39

(58) Field of Classification Search .................. 474/28, 474/70; 701/51, 29; 180/366, 65.2; 477/39
See application file for complete search history.

(56) References Cited

U.S. PATENT DOCUMENTS

| | | | | |
|---|---|---|---|---|
| 5,218,540 A | * | 6/1993 | Ishikawa et al. | 701/60 |
| 5,754,428 A | * | 5/1998 | Ishikawa | 701/55 |
| 6,443,278 B1 | * | 9/2002 | Hori et al. | 192/3.58 |
| 7,114,585 B2 | * | 10/2006 | Man et al. | 180/65.21 |
| 7,493,203 B2 | * | 2/2009 | Bitzer et al. | 701/51 |
| 2004/0173393 A1 | * | 9/2004 | Man et al. | 180/65.2 |
| 2005/0227809 A1 | * | 10/2005 | Bitzer et al. | 477/37 |
| 2008/0183359 A1 | * | 7/2008 | Sawada | 701/54 |

FOREIGN PATENT DOCUMENTS

WO   WO 2006/009014 A1   1/2006

* cited by examiner

*Primary Examiner*—Emmanuel M Marcelo
(74) *Attorney, Agent, or Firm*—Rabin & Berdo, PC

(57) ABSTRACT

To prevent engine speed from increasing during low-speed operation, a transmission includes a change-gear mechanism, a centrifugal clutch, a control unit and a secondary sheave rotation sensor. The change-gear mechanism has an input shaft, an output shaft and an actuator for changing a change-gear ratio between the input and output shafts. The centrifugal clutch is connected to the output shaft. The control unit controls the actuator. The secondary sheave rotation sensor detects and outputs a rotational speed of the output shaft to the control unit. The control unit controls the actuator based on a target change-gear ratio obtained by dividing a target rotational speed of the input shaft by the rotational speed of the output shaft.

13 Claims, 11 Drawing Sheets

TRANSMISSION, POWER UNIT HAVING THE SAME, VEHICLE, CONTROLLER FOR TRANSMISSION, AND METHOD OF CONTROLLING TRANSMISSION

RELATED APPLICATIONS

This application claims the benefit of priority under 35 USC 119 of Japanese patent application no. 2007-072359, filed on Mar. 20, 2007, and Japanese patent application no. 2007-277114, filed on Oct. 25, 2007, which applications are hereby incorporated by reference in their entireties.

BACKGROUND OF THE INVENTION

1. Field of the Invention

The present invention relates to a transmission for a vehicle.

2. Description of Related Art

As an example, WO2006/009014 discloses a method of controlling an electronically-controlled belt continuously variable transmission ("ECVT") as described below.

A target change-gear ratio is determined by a throttle opening signal and a vehicle speed signal. A target sheave position of a movable sheave half of a primary sheave is calculated from the determined target change-gear ratio. Then, a voltage such that the movable sheave half of the primary sheave is displaced to the calculated target sheave position is applied to an electric motor for driving the movable sheave half of the primary sheave. Thereby, the change-gear ratio is controlled to reach the target change-gear ratio.

However, a problem occurs in the method of controlling the change-gear ratio of WO2006/009014. As a centrifugal clutch disposed between an output shaft of the ECVT and the drive wheel wears out with time, engine speed increases during low-speed operation. This problem of increased engine speed occurs particularly during idling.

SUMMARY OF THE INVENTION

The present invention addresses the foregoing problem and prevents increased engine speed during low-speed operation.

The present invention is directed to a transmission including a change-gear mechanism, a centrifugal clutch, a control unit and an output shaft rotational speed sensor. The change-gear mechanism has an input shaft, an output shaft and an actuator. The actuator changes a change-gear ratio between the input and output shafts. The centrifugal clutch is connected to the output shaft. The control unit controls the actuator. The output shaft rotational speed sensor detects a rotational speed of the output shaft. The output shaft rotational speed sensor outputs the detected rotational speed of the output shaft to the control unit. The control unit controls the actuator based on a target change-gear ratio obtained by dividing a target rotational speed of the input shaft by the rotational speed of the output shaft.

The present invention is also directed to a power unit including the transmission.

The present invention is also directed to a vehicle including a power unit. The power unit has a drive source and a transmission. The transmission includes a change-gear mechanism, a centrifugal clutch, a control unit and an output shaft rotational speed sensor. The change-gear mechanism has an input shaft, an output shaft and an actuator. The actuator changes a change-gear ratio between the input and output shafts. The centrifugal clutch is connected to the output shaft. The control unit controls the actuator. The output shaft rotational speed sensor detects a rotational speed of the output shaft. The output shaft rotational speed sensor outputs the detected rotational speed of the output shaft to the control unit. The control unit controls the actuator based on a target change-gear ratio obtained by dividing a target rotational speed of the input shaft by the rotational speed of the output shaft.

The present invention is also directed to a controller for controlling a transmission including a change-gear mechanism having an input shaft, an output shaft, and an actuator for changing a change-gear ratio between the input and output shafts; a centrifugal clutch connected to the output shaft; a control unit for controlling the actuator; and an output shaft rotational speed sensor for detecting a rotational speed of the output shaft.

The controller of the present invention controls the actuator based on a target change-gear ratio obtained by dividing a target rotational speed of the input shaft by the rotational speed of the output shaft.

The present invention is also directed to a method of controlling a transmission including a change-gear mechanism having an input shaft, an output shaft, and an actuator for changing a change-gear ratio between the input shaft and the output shaft; a centrifugal clutch connected to the output shaft; a control unit for controlling the actuator; and an output shaft rotational speed sensor for detecting a rotational speed of the output shaft.

The control method of the present invention includes controlling the actuator based on a target change-gear ratio obtained by dividing a target rotational speed of the input shaft by the rotational speed of the output shaft.

The present invention prevents an increase in an engine speed during low-speed operation.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Construction of Two-Wheeled Motorized Vehicle 1

—General Construction of Two-Wheeled Motorized Vehicle 1—

Figure 1:
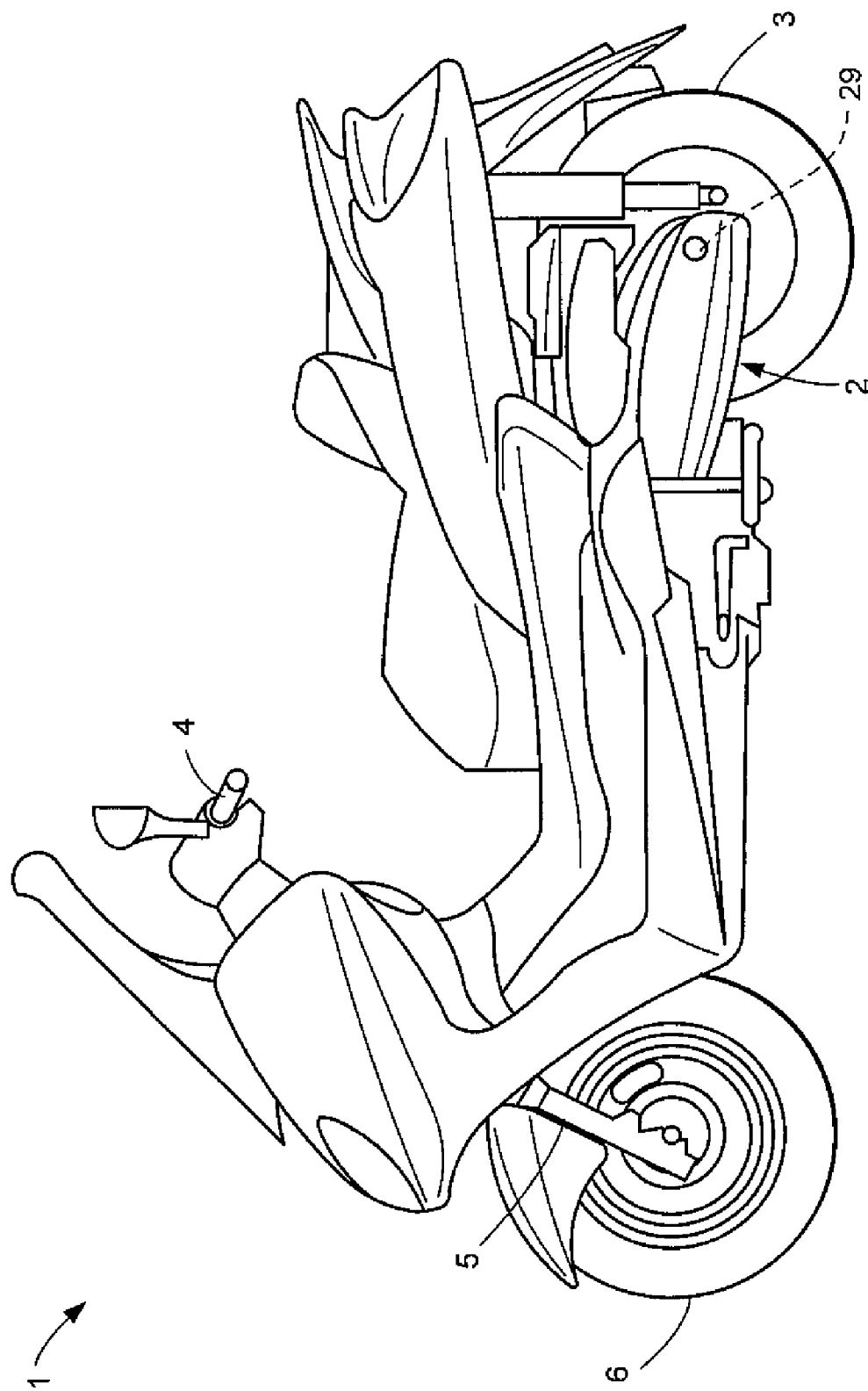
FIG. 1 is a side view of a two-wheeled motorized vehicle embodying the present invention.

An embodiment of the present invention is now described in detail, using two-wheeled motorized vehicle 1 of FIG. 1 as an example. As shown in FIG. 1, vehicle 1 has a power unit 2 suspended from a body frame. A rear wheel 3 provided at a rear end of power unit 2 is a drive wheel for driving a wheel with power of power unit 2.

A head pipe extends downward from steering handlebars 4. Front forks 5 are connected to a bottom end of the head pipe. A front wheel 6 is rotatably attached to lower ends of front forks 5. Front wheel 6, not connected to power unit 2, is a driven wheel.

—Construction of Power Unit 2—

The construction of power unit 2 is now described with reference to FIGS. 2 and 3.

{Construction of Engine 10}

Figure 2:
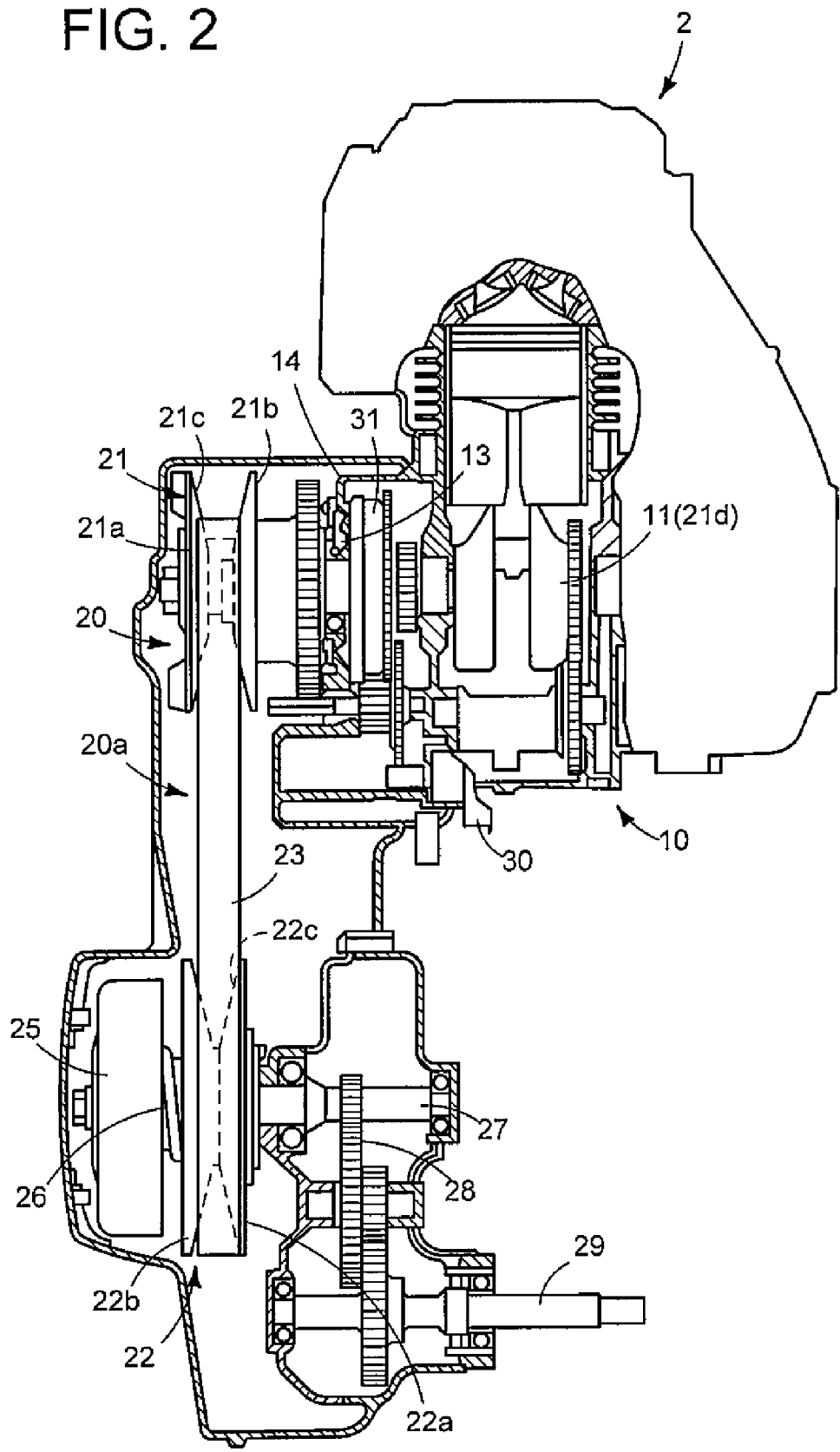
FIG. 2 is a sectional view of an engine unit.
Figure 3:
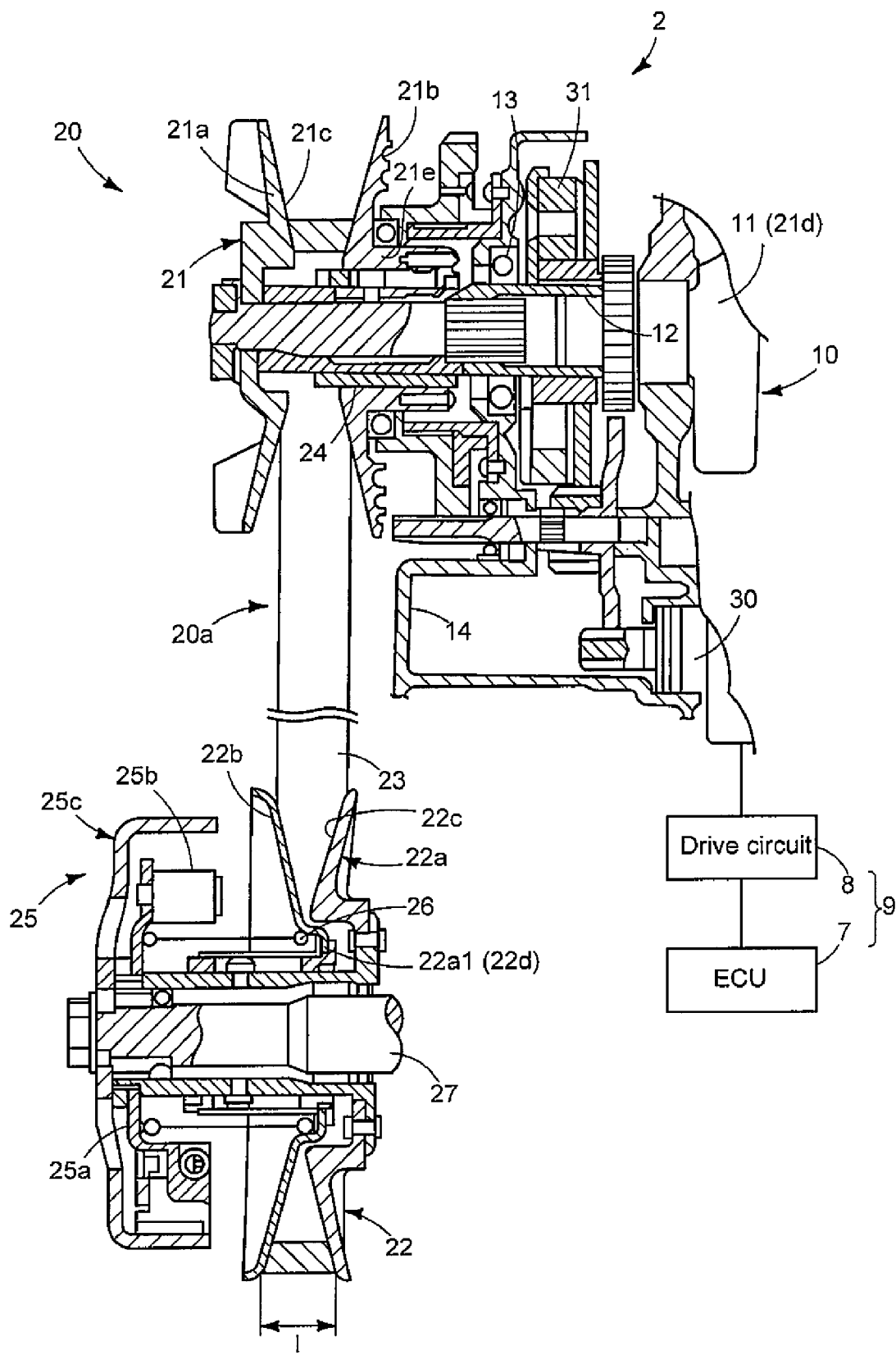
FIG. 3 is a partial sectional view of an ECVT.

As shown in FIGS. 2 and 3, power unit 2 has an engine (internal combustion engine) 10 and a transmission 20. In the embodiment of the invention, engine 10 is described as a forced-air-cooled four-stroke engine. However, engine 10 may be another type of engine, such as a water-cooled or a two-stroke engine.

As shown in FIG. 3, engine 10 has a crankshaft 11. A sleeve 12 is spline-fitted onto an outer circumference of crankshaft 11 and is rotatably supported by a housing 14 via a bearing 13. A one-way clutch 31 connected to a motor 30, serving as an actuator, is mounted onto a periphery of sleeve 12.

{Construction of Transmission 20}

As shown in FIG. 3, transmission 20 comprises a change-gear mechanism 20a controlled by a control unit 9. Control unit 9 comprises an ECU 7 serving as a computing unit, and a drive circuit 8 serving as a drive unit. In the embodiment of the invention, change-gear mechanism 20a is described as a belt-type ECVT as one example. The belt of the ECVT may be a resin belt, a metal belt, or another type of belt. Change-gear mechanism 20a is not limited to a belt-type ECVT. For example, change-gear mechanism 20a may be a toroidal type ECVT.

Change-gear mechanism 20a is provided with a V-belt 23 wrapped around a primary sheave 21 and a secondary sheave 22. V-belt 23 is formed into an approximately V-shape in section.

Primary sheave 21 is connected to crankshaft 11 as an input shaft 21d and rotates together with crankshaft 11. Primary sheave 21 includes a primary fixed sheave half 21a fixed to one end of crankshaft 11 and opposed to a primary movable sheave half 21b that is movable in the axial direction of crankshaft 11. Opposing surfaces of primary fixed sheave half 21a and movable sheave half 21b form a belt groove 21c onto which V-belt 23 is wound. Belt groove 21c is formed wider toward the radially outer side of primary sheave 21.

As shown in FIG. 3, primary movable sheave half 21b has a cylindrical boss 21e through which crankshaft 11 passes. A cylindrical slider 24 is fixed to an inner side of boss 21e. Primary movable sheave half 21b integral with slider 24 is movable in the axial direction of crankshaft 11. Accordingly, a width of belt groove 21c is variable.

The width of belt groove 21c of primary sheave 21 is varied when motor 30 actuates primary movable sheave half 21b in the axial direction of crankshaft 11. That is, transmission 20 is an ECVT in which the change-gear ratio is electronically controlled. In the embodiment of the invention, motor 30 is driven by pulse width modulation (PWM drive). However, the method for driving motor 30 is not particularly limited to PWM drive. For example, motor 30 may be driven by pulse-amplitude modulation. Alternatively, motor 30 may be a stepping motor. In addition, while motor 30 is an example of an actuator, another actuator such as a hydraulic actuator may be used.

Secondary sheave 22 is located at the rear of primary sheave 21 and is mounted to a secondary sheave shaft 27 via a centrifugal clutch 25. Secondary sheave 22 includes a secondary fixed sheave half 22a opposed to a secondary movable sheave half 22b. Secondary fixed sheave half 22a includes a cylindrical portion 22a1 forming an output shaft 22d of transmission 20. Secondary fixed sheave half 22a is connected to secondary sheave shaft 27 via centrifugal clutch 25 and is movable in the axial direction of secondary sheave shaft 27. Opposing surfaces of secondary fixed sheave half 22a and movable sheave half 22b form a belt groove 22c onto which V-belt 23 is wound. Belt groove 22c is formed wider toward the radially outer side of secondary sheave 22.

Secondary movable sheave half 22b is urged by a spring 26 in a direction to decrease a width of belt groove 22c. In view of this, when motor 30 is driven, and the width of belt groove 21c of primary sheave 21 decreases, a diameter with which V-belt 23 is wrapped around primary sheave 21 increases, while V-belt 23 on the side of secondary sheave 22 is pulled radially inward. Thus, secondary movable sheave half 22b moves against the urging force of spring 26 in a direction that increases the width of belt groove 22c. Therefore, the diameter with which V-belt 23 is wrapped around secondary sheave 22 decreases. This results in a change in change-gear ratio of change-gear mechanism 20a.

Centrifugal clutch 25 is engaged or disengaged depending on a rotational speed of cylindrical portion 22a1 as output shaft 22d included in secondary fixed sheave half 22a. That is, if the rotational speed of output shaft 22d is below a predetermined rotational speed, centrifugal clutch 25 is disengaged and rotations of secondary fixed sheave half 22a are not transmitted to secondary sheave shaft 27. In contrast, if the rotational speed of output shaft 22d is equal to or higher than a predetermined rotational speed, centrifugal clutch 25 is engaged and rotations of secondary fixed sheave half 22a are transmitted to secondary sheave shaft 27.

{Construction of Centrifugal Clutch 25}

As shown in FIG. 3, centrifugal clutch 25 includes a centrifugal plate 25a, a centrifugal weight 25b and a clutch housing 25c. Centrifugal plate 25a rotates together with secondary fixed sheave half 22a and output shaft 22d. Centrifugal weight 25b is supported by centrifugal plate 25a such that it is displaceable in the radial direction of centrifugal plate 25a. Clutch housing 25c is fixed to one end of secondary sheave shaft 27. Secondary sheave shaft 27 is connected to an axle 29 via a deceleration mechanism 28. Rear wheel 3 is mounted to axle 29. Therefore, clutch housing 25c is connected to drive or rear wheel 3 via secondary sheave shaft 27, deceleration mechanism 28 and axle 29.

Clutch housing 25c engages with or disengages from centrifugal plate 25a depending on the rotational speed of output shaft 22d. If the rotational speed of output shaft 22d is equal to or higher than a predetermined rotational speed, centrifugal weight 25b is moved by centrifugal force toward the radially outer side of centrifugal plate 25a to contact and engage with clutch housing 25c. When centrifugal plate 25a and clutch housing 25c engage with each other, rotations of output shaft 22d are transmitted to drive or rear wheel 3 through clutch housing 25c, secondary sheave shaft 27, deceleration mechanism 28 and axle 29. In contrast, if the rotational speed of output shaft 22d is below a predetermined rotational speed, centrifugal force applied to centrifugal weight 25b decreases, so that centrifugal weight 25b moves away from clutch housing 25c. Therefore, rotations of output shaft 22d are not transmitted to clutch housing 25c and rear wheel 3 does not rotate.

(System for Controlling Two-Wheeled Motorized Vehicle 1)

A system for controlling two-wheeled motorized vehicle 1 is now described with reference to FIG. 4.

—Overview of System for Controlling Two-Wheeled Motorized Vehicle 1—

Figure 4:
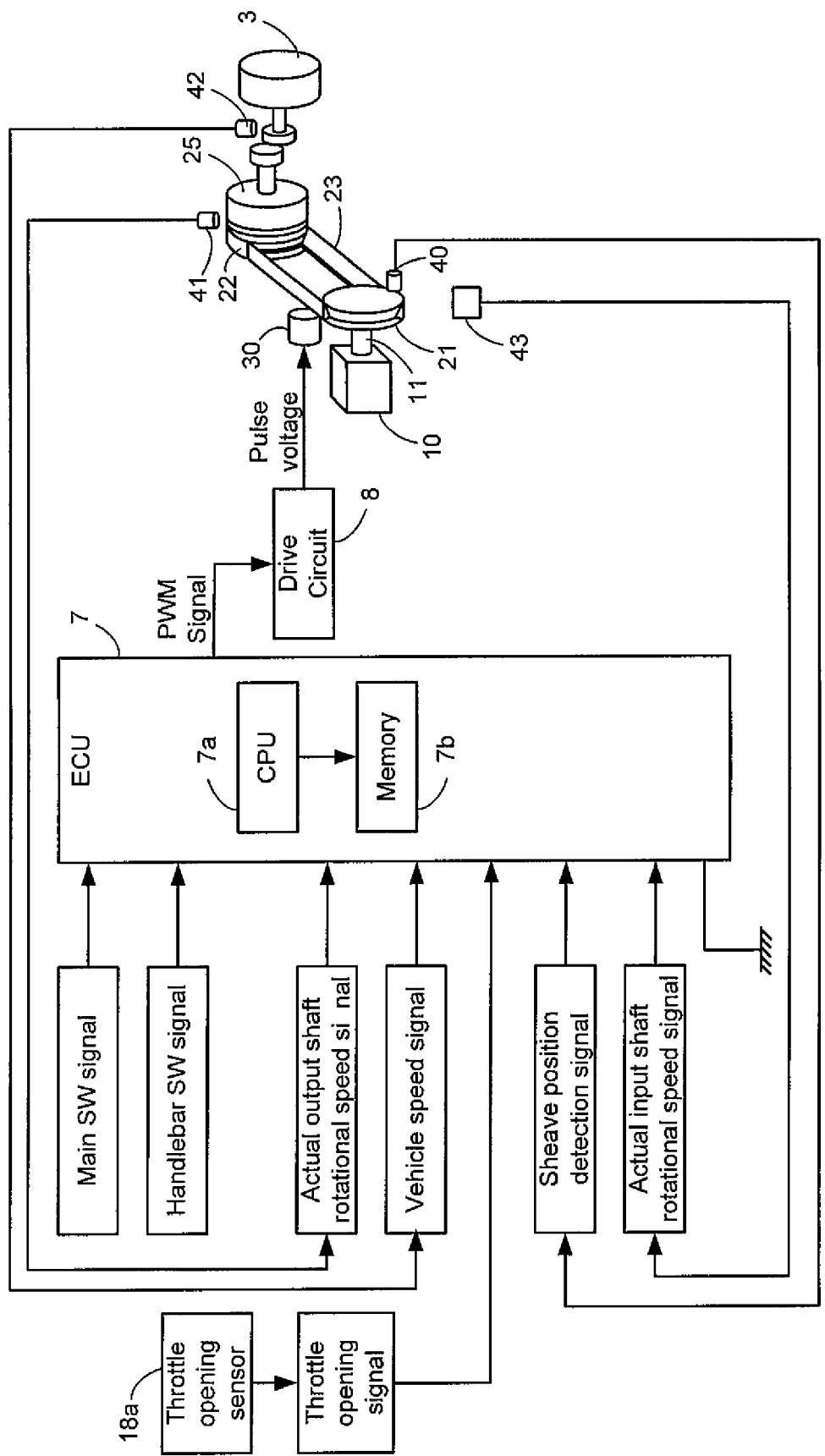
FIG. 4 is a block diagram of a system for controlling the two-wheeled motorized vehicle.

As shown in FIG. 4, a sheave position sensor 40 connected to ECU 7 detects a position of primary movable sheave half 21b of primary sheave 21 relative to primary fixed sheave half 21a. In other words, sheave position sensor 40 detects a distance (I) between primary fixed sheave half 21a and primary movable sheave half 21b in the axial direction of crankshaft 11. Sheave position sensor 40 outputs the detected distance (I) to ECU 7 as a sheave position detection signal. Sheave position sensor 40 may be formed by a potentiometer, for example.

In addition, a primary sheave rotation sensor 43 as an input shaft rotational speed sensor, a secondary sheave rotation sensor 41 as an output shaft rotational speed sensor, and a vehicle speed sensor 42 are connected to ECU 7. Primary sheave rotation sensor 43 detects a rotational speed of primary sheave 21 or input shaft 21d and outputs the detected rotational speed to ECU 7 as an actual input shaft rotational speed signal. Secondary sheave rotation sensor 41 detects a rotational speed of secondary sheave 22 or output shaft 22d and outputs the detected rotational speed to ECU 7 as an actual output shaft rotational speed signal. Vehicle speed sensor 42 detects a rotational speed of rear wheel 3 and outputs a vehicle speed signal to ECU 7 based on the detected rotational speed.

A handlebar switch attached to steering handlebars 4 is connected to ECU 7. The handlebar switch outputs a handlebar SW signal when operated by a rider.

As described above, a throttle opening sensor 18a outputs a throttle opening signal to ECU 7.

ECU 7 includes a central processing unit (CPU) 7a as a computing unit. A memory 7b connected to CPU 7a stores various settings, such as a map 70 for determining a target engine speed, which will be discussed later.

—Control of Transmission 20—

Figure 5:
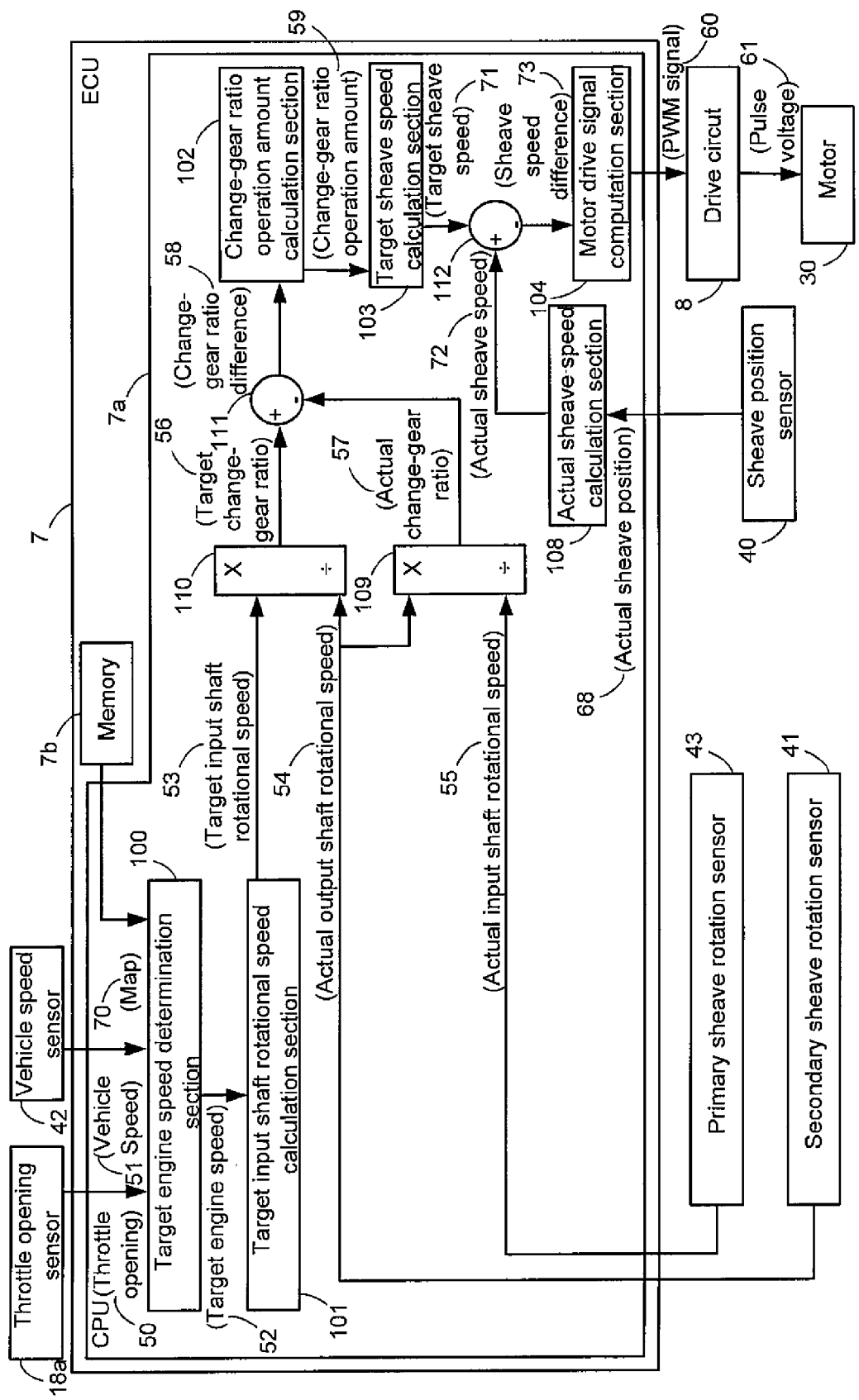
FIG. 5 is a block diagram illustrating transmission control.

A method of controlling transmission 20 according to the embodiment of the invention is described with reference to FIG. 5. As shown in FIG. 5, electric motor 30, serving as an actuator, is controlled such that a difference is reduced between a target change-gear ratio 56, which is obtained by dividing a target input shaft rotational speed 53 by an actual output shaft rotational speed 54, and an actual change-gear ratio 57, which is obtained by dividing an actual input shaft rotational speed 55 by actual output shaft rotational speed 54. Specifically, motor 30 is controlled such that target change-gear ratio 56 and actual change-gear ratio 57 are approximately equal.

Figure 6:
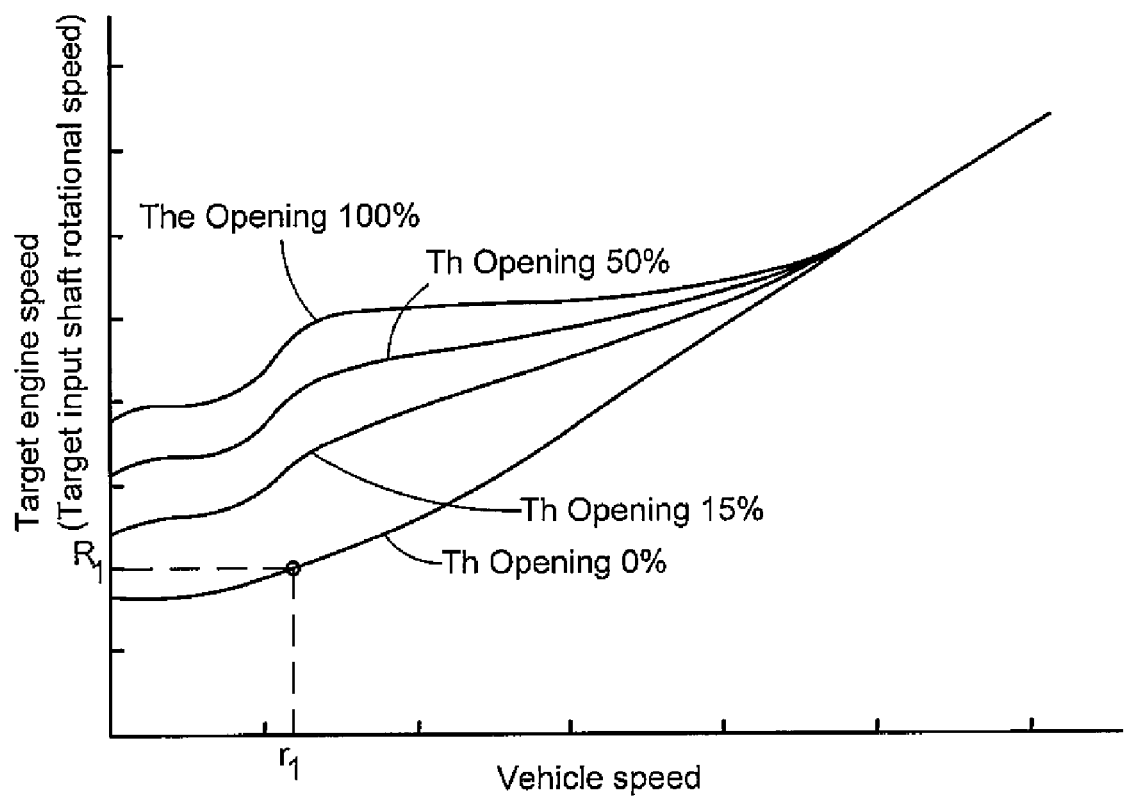
FIG. 6 is an example of a map for determining a target engine speed.

As shown in FIG. 5, throttle opening sensor 18a first outputs a throttle opening 50 to a target engine speed determination section 100 provided in CPU 7a. Vehicle speed sensor 42 outputs a vehicle speed 51 to target engine speed determination section 100. Target engine speed determination section 100 retrieves map 70 for determining a target engine speed from memory 7b. As exemplified in FIG. 6, a relationship between a vehicle speed for respective throttle openings and a target engine speed is established in map 70 for determining a target engine speed. Target engine speed determination section 100 determines a target engine speed 52 based on map 70, throttle opening 50 and vehicle speed 51. For example, target engine speed 52 is determined to be $R_1$, where the throttle opening is 0% and the vehicle speed is $r_1$, as shown in FIG. 6. Target engine speed determination section 100 outputs the determined target engine speed 52 to a target input shaft rotational speed calculation section 101.

For convenience of explanation, FIG. 6 only illustrates relationships where the throttle opening (Th opening) is 0%, 15%, 50% and 100%.

Target input shaft rotational speed calculation section 101 calculates a target input shaft rotational speed 53 of input shaft 21d from the inputted target engine speed 52. Target input shaft rotational speed calculation section 101 outputs the calculated target input shaft rotational speed 53 to a division section 110. In this embodiment, because crankshaft 11 of engine 10 and input shaft 21d are a common member, target engine speed 52 and target input shaft rotational speed 53 are equal. That is, target input shaft rotational speed calculation section 101 outputs target engine speed 52 as target input shaft rotational speed 53.

Division section 110 divides target input shaft rotational speed 53, which is inputted from target input shaft rotational speed calculation section 101, by actual output shaft rotational speed 54, which is outputted from secondary sheave rotation sensor 41, in order to calculate a target change-gear ratio 56. Division section 110 outputs the calculated target change-gear ratio 56 to a subtraction section 111.

In turn, division section 109 divides actual input shaft rotational speed 55, which is outputted from primary sheave rotation sensor 43, by actual output shaft rotational speed 54 in order to calculate an actual change-gear ratio 57. Division section 109 outputs the calculated actual change-gear ratio 57 to subtraction section 111. Actual change-gear ratio 57 is an actual change-gear ratio of transmission 20.

Subtraction section 111 subtracts actual change-gear ratio 57 from target change-gear ratio 56 in order to calculate a change-gear ratio difference 58. Subtraction section 111 outputs the calculated change-gear ratio difference 58 to a change-gear ratio operation amount calculation section 102. Change-gear ratio operation amount calculation section 102 calculates a change-gear ratio operation amount 59, which reduces a difference between target change-gear ratio 56 and actual change-gear ratio 57, based on change-gear ratio difference 58. Specifically, change-gear ratio operation amount calculation section 102 calculates change-gear ratio operation amount 59 such that target change-gear ratio 56 and actual change-gear ratio 57 are approximately equal. Change-gear ratio operation amount calculation section 102 outputs the calculated change-gear ratio operation amount 59 to a target sheave speed calculation section 103. In this embodiment, change-gear ratio operation amount 59 is a difference between a current change-gear ratio and a change-gear ratio such that target change-gear ratio 56 and actual change-gear ratio 57 are substantially equal. In other words, change-gear ratio operation amount 59 is a magnitude of the change-gear ratio to be varied in order to substantially equalize target change-gear ratio 56 and actual change-gear ratio 57 to each other.

Target sheave speed calculation section 103 calculates a target sheave speed 71 according to the inputted change-gear ratio operation amount 59. Target sheave speed calculation section 103 outputs the calculated target sheave speed 71 to a subtraction section 112. Target sheave speed 71 is a moving speed of primary movable sheave half 21b, which is used to change the change-gear ratio of change-gear mechanism 20a by change-gear ratio operation amount 59.

An actual sheave speed calculation section 108, provided in CPU 7a, calculates an actual sheave speed 72 based on an actual sheave position 68 outputted from sheave position sensor 40. Actual sheave speed calculation section 108 outputs the calculated actual sheave speed 72 to subtraction section 112. Actual sheave speed 72 is a current moving speed of primary movable sheave half 21b.

Subtraction section 112 subtracts actual sheave speed 72 from target sheave speed 71 in order to calculate a sheave speed difference 73. Subtraction section 112 outputs sheave speed difference 73 to a motor drive signal computation section 104.

Motor drive signal computation section 104 computes a PWM signal 60 according to sheave speed difference 73. Motor drive signal computation section 104 outputs the computed PWM signal 60 to drive circuit 8. Drive circuit 8 applies a pulse voltage 61 to electric motor 30 according to the inputted PWM signal 60. Thereby, primary movable sheave half 21b is driven to change the change-gear ratio of transmission 20.

(Function and Effect)

Figure 7:
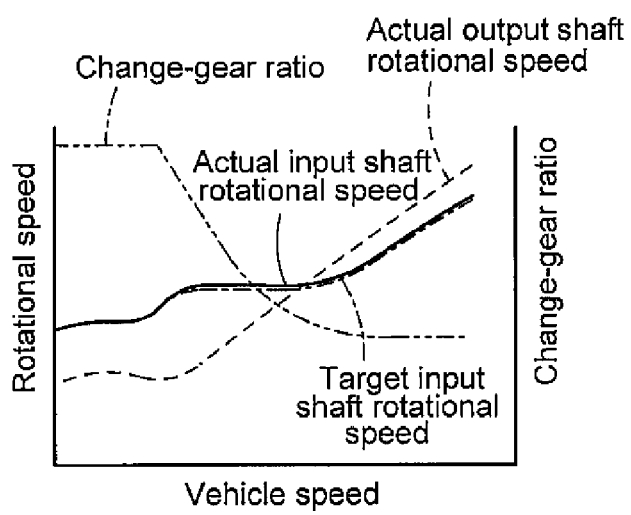
FIG. 7 is a graph illustrating rotational speeds of input and output shafts when a transmission, in which a target change-gear ratio is determined based on throttle opening and vehicle speed, is in initial use.

As an example, it is conceivable that the transmission is controlled in the following manner. The CPU calculates a target change-gear ratio based on the throttle opening, which is outputted from the throttle opening sensor, and the vehicle speed, which is outputted from the vehicle speed sensor. The CPU outputs a PWM signal according to the calculated target change-gear ratio to the drive circuit. The drive circuit applies a pulse voltage to the electric motor according to the PWM signal. In this manner, the transmission is controlled such that the change-gear ratio of the transmission is substantially equalized to the target change-gear ratio, as shown in FIG. 7.

Figure 8:
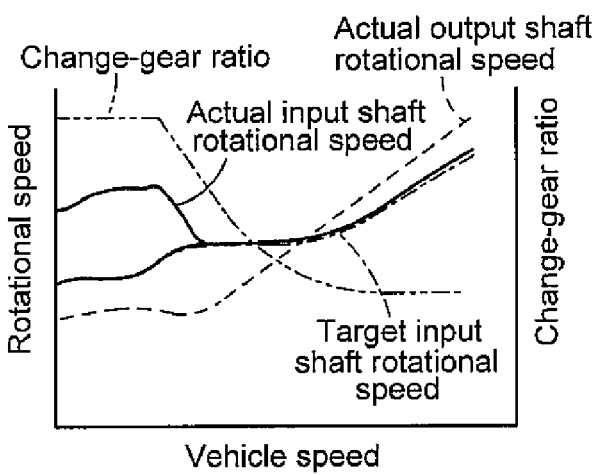
FIG. 8 is a graph illustrating rotational speeds of the input and output shafts after the transmission, in which the target change-gear ratio is determined based on the throttle opening and vehicle speed, deteriorates with time.

However, in the aforementioned method for controlling the transmission, the target change-gear ratio is determined based on the throttle opening and the vehicle speed. Therefore, as long as the throttle opening and the vehicle speed are the same, the target change-gear ratio remains constant. For example, as can be seen in FIGS. 7 and 8 in which their respective change-gear ratios are substantially equal, the change-gear ratio remains unchanged as long as the throttle opening and the vehicle speed remain the same, even though the centrifugal clutch deteriorates with time and thus becomes more difficult to be engaged.

When the centrifugal clutch deteriorates with time and becomes more difficult to be engaged, the engine load at low speeds decreases. Specifically, as the rotational speed, at which the centrifugal clutch is engaged, increases due to wear of the centrifugal clutch, the load on the engine decreases in a rotational speed range within which the centrifugal clutch cannot be engaged and in a rotational speed range within which the degree of engagement of the centrifugal clutch decreases. Consequently, the actual input shaft rotational speed shown in FIG. 8 is higher than the target input shaft rotational speed obtained in initial use of the transmission. That is, the actual input shaft rotational speed and the engine speed increase.

On the contrary, in this embodiment, as shown in FIG. 5, target engine speed 52 and target input shaft rotational speed 53 are determined based on throttle opening 50, vehicle speed 51 and map 70 for determining a target engine speed. Target engine speed 52 and target input shaft rotational speed 53 are kept constant as long as throttle opening 50 and vehicle speed 51 remain the same.

On the other hand, target change-gear ratio 56 is calculated by dividing target input shaft rotational speed 53 by actual output shaft rotational speed 54. Actual output shaft rotational speed 54 varies with condition changes, such as deterioration of centrifugal clutch 25. Thus, target change-gear ratio 56 varies due to conditions such as deterioration of centrifugal clutch 25.

Figure 9:
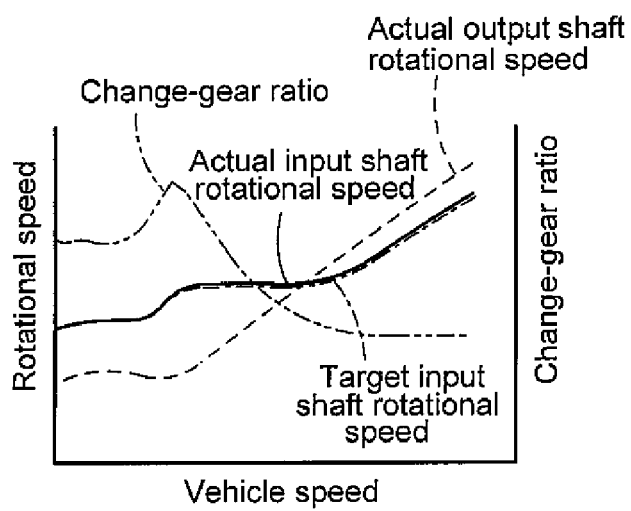
FIG. 9 is a graph illustrating rotational speed of the input and output shafts upon deterioration of a transmission with time in the embodiment of the invention.

For example, as centrifugal clutch 25 deteriorates with time, the load on engine 10 generated by engagement of centrifugal clutch 25 decreases. Thus, actual output shaft rotational speed 54 increases with engine speed. This results in the smaller target change-gear ratio 56, as shown in FIG. 9. As target change-gear ratio 56 becomes smaller, the actual output shaft rotational speed 54 becomes higher. This helps centrifugal clutch 25 to be easily engaged. In addition, due to the smaller target change-gear ratio 56, the load on engine 10 becomes relatively larger. Therefore, an increase in engine speed is suppressed.

Furthermore, in this embodiment, motor 30 is controlled such that a difference between target change-gear ratio 56 and actual change-gear ratio 57 is reduced. That is, motor 30 is controlled such that a difference between target input shaft rotational speed 53 and actual input shaft rotational speed 55 is reduced. Thus, an increase in engine speed is more securely suppressed. In this embodiment, because motor 30 is controlled such that target change-gear ratio 56 and actual change-gear ratio 57 are approximately equal, an increase in engine speed is particularly suppressed in a secure manner.

As described above, an increase in engine speed is suppressed by controlling motor 30 based on target change-gear ratio 56, which is calculated by dividing target input shaft rotational speed 53 by actual output shaft rotational speed 54. The present invention does not specifically limit a control method for controlling motor 30 based on target change-gear ratio 56. The control method for controlling motor 30 based on target change-gear ratio 56 may be implemented, for example, as shown in the following variations 1 to 4.

Variations 1 to 4 are also described with reference to FIGS. 1-4 that are shared in common with the previously-described embodiment of the invention. Components having substantially the same function as components previously described are illustrated with a common reference numeral and repeat description is omitted.

<<First Variation>>

Figure 10:
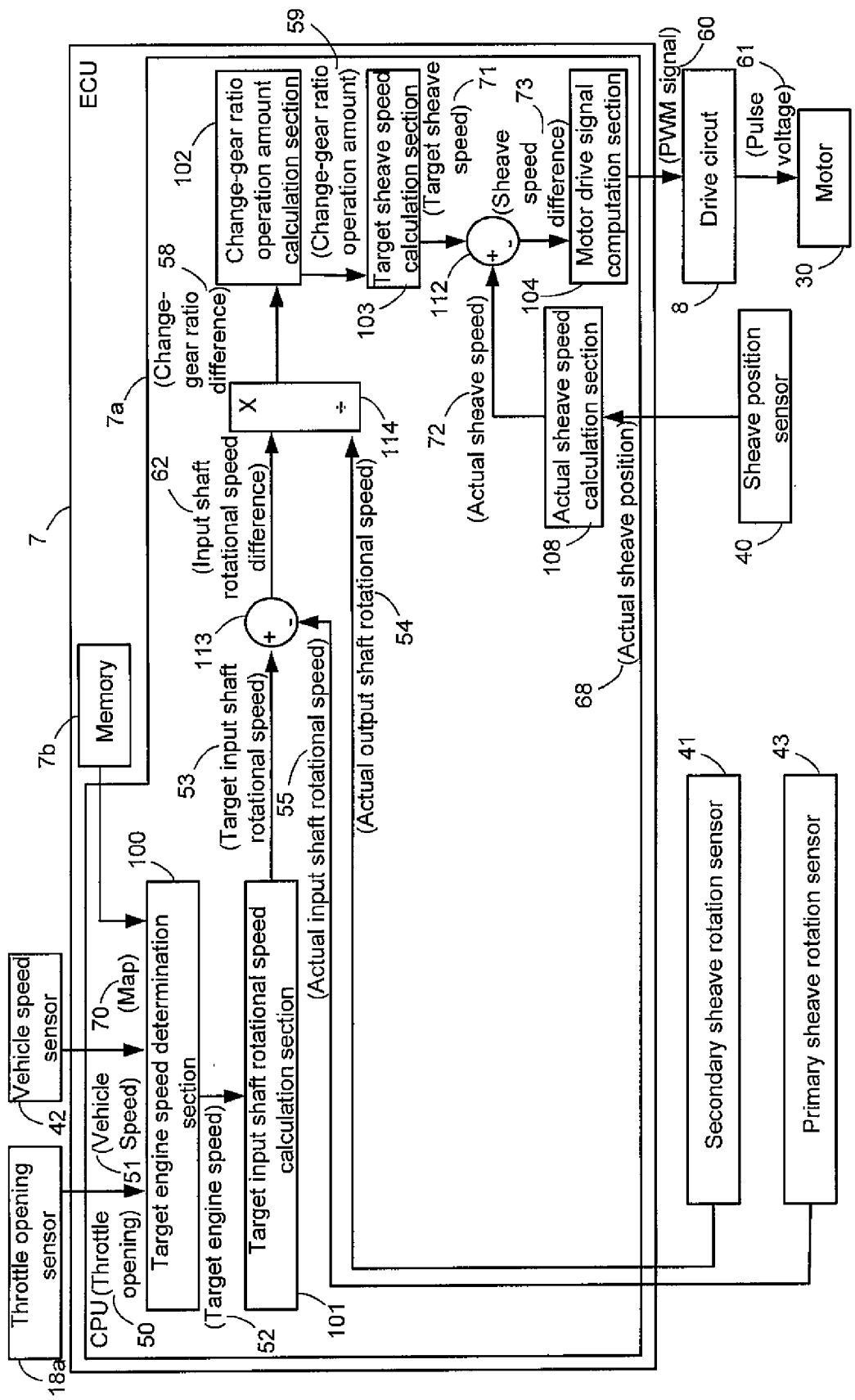
FIG. 10 is a block diagram for controlling a transmission according to a variation 1.

In the above embodiment of the invention, as shown in FIG. 5, change-gear ratio difference 58 is calculated by subtracting actual change-gear ratio 57 from target change-gear ratio 56. However, change-gear ratio difference 58 may instead be calculated in a manner shown in FIG. 10.

Specifically, in the first variation, subtraction section 113 subtracts actual input shaft rotational speed 55 from target input shaft rotational speed 53 outputted from target input shaft rotational speed calculation section 101, in order to calculate an input shaft rotational speed difference 62. Subtraction section 113 outputs calculated input shaft rotational speed difference 62 to a division section 114. Division section 114 divides inputted input shaft rotational speed difference 62, which is inputted to division section 114, by actual output shaft rotational speed 54 in order to calculate change-gear ratio difference 58. Calculated change-gear ratio difference 58 is outputted to change-gear ratio operation amount calculation section 102, as described above in the main embodiment of the invention.

<<Second Variation>>

Figure 11:
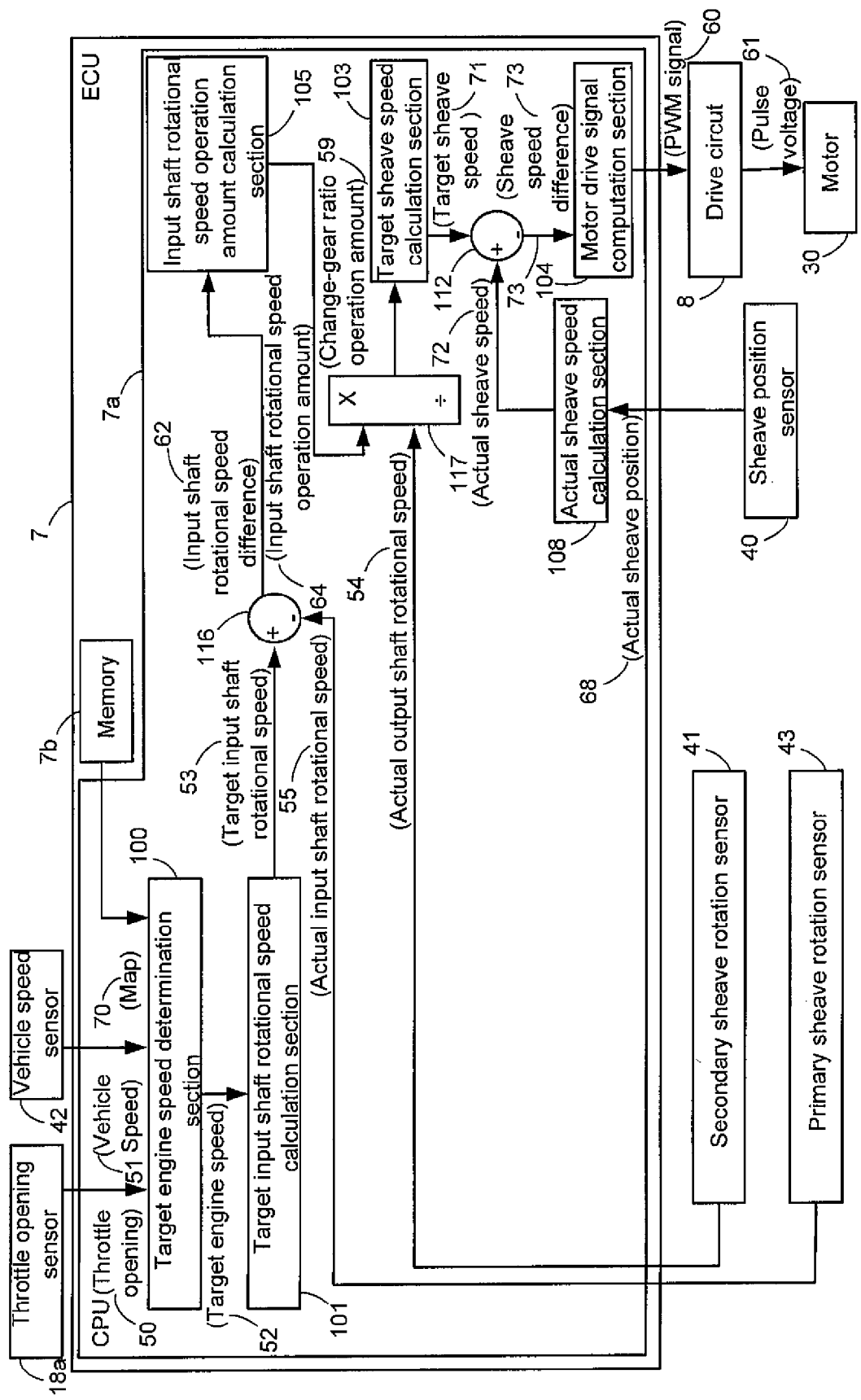
FIG. 11 is a block diagram for controlling a transmission according to a variation 2.

In the main embodiment of the invention and the first variation thereof, change-gear ratio operation amount 59 is calculated based on change-gear ratio difference 58. However, the present invention is not limited to this calculation method. Change-gear ratio operation amount 59 may be calculated, for example, as shown in FIG. 11.

Specifically, in the second variation, subtraction section 116 subtracts actual input shaft rotational speed 55 from target input shaft rotational speed 53 outputted from target input shaft rotational speed calculation section 101, in order to calculate input shaft rotational speed difference 62. Subtraction section 116 outputs input shaft rotational speed difference 62 to input shaft rotational speed operation amount calculation section 105. Input shaft rotational speed operation amount calculation section 105 calculates the input shaft rotational speed operation amount 64 according to input shaft rotational speed difference 62. Input shaft rotational speed operation amount calculation section 105 outputs the calculated input shaft rotational speed operation amount 64 to a division section 117. Input shaft rotational speed operation amount 64 is an amount to manipulate the rotational speed of input shaft 21d necessary to reduce a difference between target change-gear ratio 56 and actual change-gear ratio 57. In other words, input shaft rotational speed operation amount 64 is designed to manipulate or vary rotational speed of input shaft 21d by input shaft rotational speed operation amount 64. Thereby, the difference between target input shaft rotational speed 53 and actual input shaft rotational speed 55 is reduced. This results in a reduction in the difference between target change-gear ratio 56 and actual change-gear ratio 57.

Division section 117 divides input shaft rotational speed operation amount 64 by actual output shaft rotational speed 54 in order to calculate change-gear ratio operation amount 59. The calculated change-gear ratio operation amount 59 is outputted to target sheave speed calculation section 103.

<<Third Variation>>

In the third variation, described with reference to FIG. 12, motor 30 is controlled by calculating sheave speed difference 73 based on the sheave position (I) of primary movable sheave half 21b.

Figure 12:
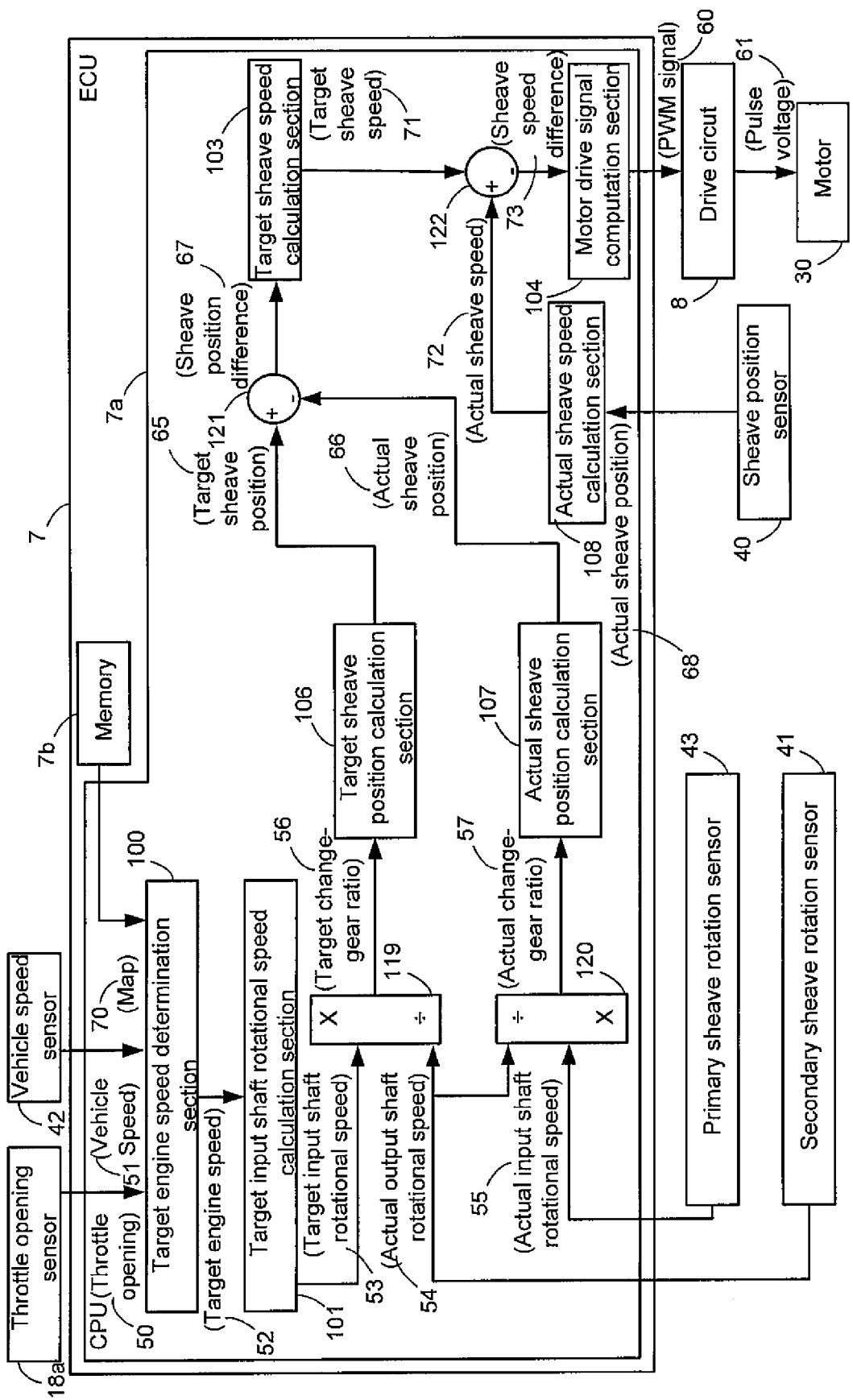
FIG. 12 is a block diagram for controlling a transmission according to a variation 3.

As shown in FIG. 12, in the third variation, a division section 119 divides target input shaft rotational speed 53, which is outputted from target input shaft rotational speed calculation section 101, by actual output shaft rotational speed 54 in order to calculate target change-gear ratio 56. Division section 119 outputs the calculated target change-gear ratio 56 to a target sheave position calculation section 106. Target sheave position calculation section 106 calculates a target sheave position 65 according to target change-gear ratio 56. Target sheave position calculation section 106 outputs the calculated target sheave position 65 to a subtraction section 121. Target sheave position 65 is a sheave position (I) of primary movable sheave half 21b when the change-gear ratio of transmission 20 reaches target change-gear ratio 56.

Division section 120 divides actual input shaft rotational speed 55 by actual output shaft rotational speed 54 in order to calculate actual change-gear ratio 57. Division section 120 outputs the calculated actual change-gear ratio 57 to an actual sheave position calculation section 107. Actual sheave position calculation section 107 calculates an actual sheave position 66 according to actual change-gear ratio 57. Actual sheave position calculation section 107 outputs the calculated actual sheave position 66 to subtraction section 121. Actual sheave position 66 is a sheave position (I) of primary movable sheave half 21b when the change-gear ratio of transmission 20 is actual change-gear ratio 57.

Subtraction section 121 subtracts actual sheave position 66 from target sheave position 65 in order to calculate a sheave position difference 67. Subtraction section 121 outputs the calculated sheave position difference 67 to target sheave speed calculation section 103.

Target sheave speed calculation section 103 calculates target sheave speed 71 based on the inputted shave position difference 67. Target sheave speed calculation section 103 outputs the calculated target sheave speed 71 to a subtraction section 122.

Subtraction section 122 subtracts actual sheave speed 72 from target sheave speed 71 in order to calculate sheave speed difference 73. Subtraction section 122 outputs the calculated sheave speed difference 73 to motor drive signal computation section 104. Motor drive signal computation section 104 then computes PWM signal 60, as described in the main embodiment of the invention.

<<Fourth Variation>>

Figure 13:
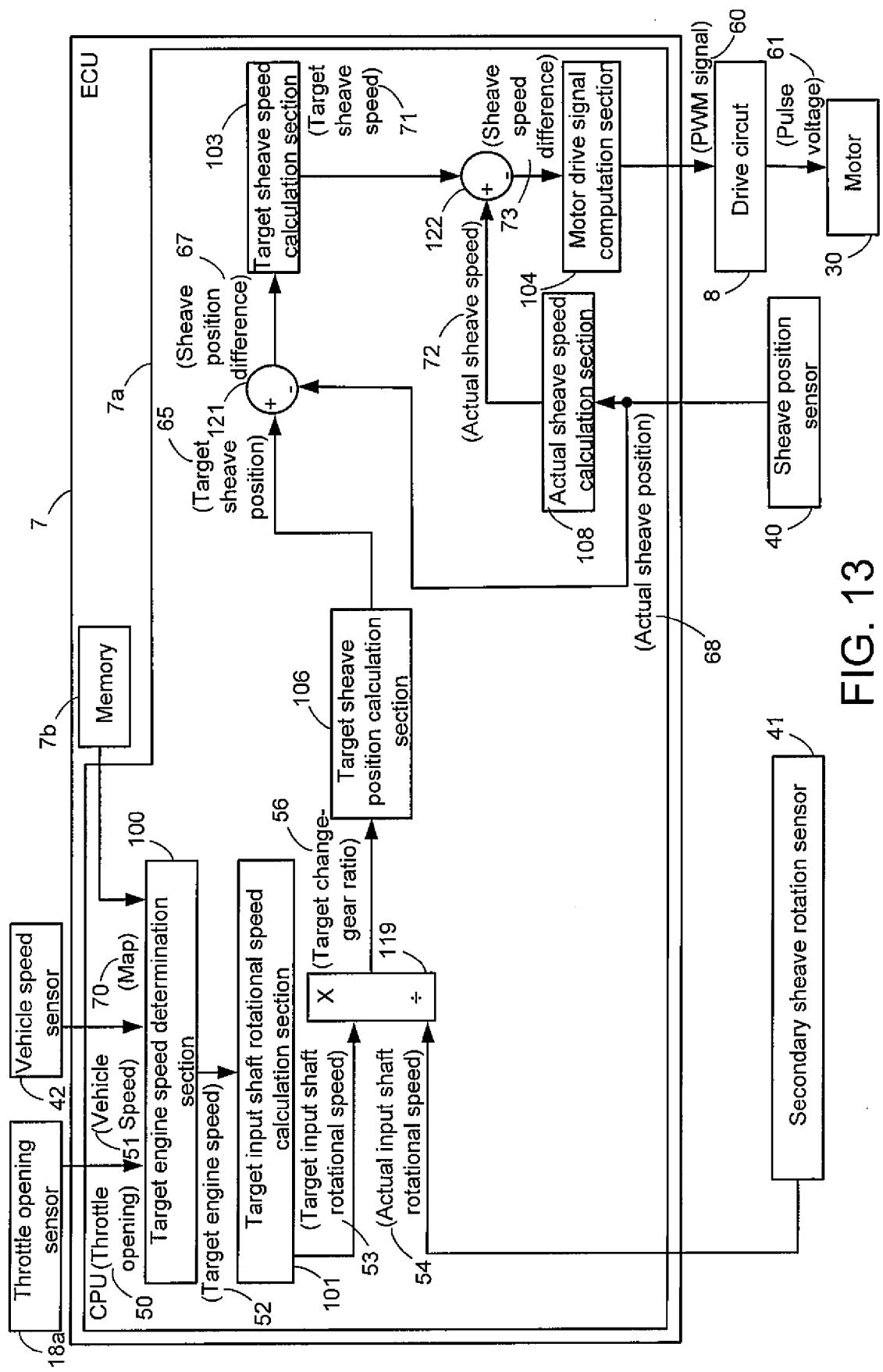
FIG. 13 is a block diagram for controlling a transmission according to a variation 4.

The fourth variation shown in FIG. 13 is a further variation of the third variation. In the third variation, subtraction section 121 subtracts actual sheave position 66, which is calculated based on actual output shaft rotational speed 54 and actual input shaft rotational speed 55, from target sheave position 65 outputted from target sheave position calculation section 106. However, the method of calculating actual sheave position 66 is not limited to the previous method. For example, as described in the fourth variation, subtraction section 121 may subtract actual sheave position 68, which is detected by sheave position sensor 40, from target sheave position 65 outputted from target sheave position calculation section 106.

<<Other Variations>>

Primary sheave 21 may not necessarily be mounted to crankshaft 11. For example, primary sheave 21 may be mounted to another rotational shaft that meshes with crankshaft 11 and rotates together with crankshaft 11.

Secondary sheave 22 may not necessarily be mounted to secondary sheave shaft 27. Secondary sheave 22 may be mounted to another rotational shaft that meshes with secondary sheave shaft 27 and rotates together with secondary sheave shaft 27.

Change-gear mechanism 20a is not limited to a belt-type ECVT. For example, change-gear mechanism 20a may be a toroidal type ECVT.

Motor 30 is not limited to a PWM-controlled motor. For example, motor 30 may be a pulse amplitude modulation (PAM)-controlled motor. Alternatively, motor 30 may be a stepping motor.

In the above embodiment of the invention, primary movable sheave half 21b is driven by motor 30. However, secondary movable sheave half 22b may be driven by motor 30.

In the above embodiment of the invention, target engine speed 52 is determined based on throttle opening 50, vehicle speed 51 and map 70 for determining a target engine speed. However, the method for determining target engine speed 52 is not specifically limited by the present invention.

<<Definition of Terms in the Specification>>

In this specification, the term "two-wheeled motorized vehicle" refers to two-wheeled motorized vehicles in a broad sense. A two-wheeled motorized vehicle includes not only motorcycles but also scooters and mopeds, for example.

The term "driving source" refers to a source that produces power. The "driving source" may be an internal combustion engine, an electric motor or the like.

The term "be connected" means both direct connection and indirect connection via other members.

The present invention is useful for a transmission and a vehicle having the transmission, such as a two-wheeled motorized vehicle.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A transmission comprising:
 a change-gear mechanism having an input shaft, an output shaft, and an actuator for changing a change-gear ratio between the input shaft and the output shaft;
 a centrifugal clutch connected to the output shaft;
 a control unit for controlling the actuator; and
 an output shaft rotational speed sensor for detecting a rotational speed of the output shaft and outputting the rotational speed of the output shaft to the control unit,
 wherein the control unit controls the actuator based on a target change-gear ratio obtained by dividing a target rotational speed of the input shaft by the rotational speed of the output shaft.

2. The transmission according to claim 1, further comprising an input shaft rotational speed sensor for detecting a rotational speed of the input shaft and outputting the rotational speed of the input shaft to the control unit, wherein the control unit controls the actuator such that a difference is reduced between the target change-gear ratio and an actual change-gear ratio obtained by dividing the rotational speed of the input shaft by the rotational speed of the output shaft.

3. The transmission according to claim 2, wherein the control unit controls the actuator such that the actual change-gear ratio and the target change-gear ratio are approximately equal.

4. The transmission according to claim 2, wherein the control unit comprises a computing unit for computing a operation amount of the change-gear ratio based on the difference between the actual change-gear ratio and the target change-gear ratio in order to reduce the difference between the actual change-gear ratio and the target change-gear ratio, and for outputting a control signal according to the computed operation amount of the change-gear ratio; and a drive unit for supplying electric power to the actuator according to the control signal.

5. The transmission according to claim 4, wherein the computing unit computes the operation amount of the change-gear ratio by obtaining an operation amount of the rotational speed of the input shaft based on a difference between the rotational speed of the input shaft and a target rotational speed of the input shaft in order to reduce the difference between the actual change-gear ratio and the target change-gear ratio, and by dividing the computed operation amount of the rotational speed of the input shaft by the rotational speed of the output shaft.

6. The transmission according to claim 1,
 wherein the change-gear mechanism further comprises:
  a primary sheave including a primary fixed sheave half provided in an undisplaceable manner relative to the input shaft, and a primary movable sheave half opposed to the primary fixed sheave half in a displaceable manner in an axial direction of the input shaft and forming a first belt groove with the primary fixed sheave half;
  a secondary sheave including a secondary fixed sheave half provided in an undisplaceable manner relative to the output shaft, and a secondary movable sheave half opposed to the secondary fixed sheave half in a displaceable manner in an axial direction of the output shaft and forming a second belt groove with the secondary fixed sheave half; and
  a belt wound onto the first belt groove and the second belt groove, and
 wherein the actuator displaces the primary movable sheave half or the secondary movable sheave half.

7. The transmission according to claim 6, further comprising an input shaft rotational speed sensor for detecting a rotational speed of the input shaft and outputting the rotational speed of the input shaft to the control unit, wherein the control unit comprises a computing unit for computing a operation amount of a sheave position based on a difference between an actual sheave position of either one of the primary movable sheave half and the secondary movable sheave half, which is calculated based on the actual change-gear ratio obtained by dividing the rotational speed of the input shaft by the rotational speed of the output shaft, and a target sheave position of either one of the primary movable sheave half and the secondary movable sheave half which is calculated based on the target change-gear ratio, in order to reduce the difference between the actual change-gear ratio and the target change-gear ratio, and for outputting a control signal according to the computed operation amount of the sheave position; and a drive unit for supplying electric power to the actuator according to the control signal.

8. The transmission according to claim 6, wherein the control unit computes a target sheave position of either one of the primary movable sheave half and the secondary movable sheave half based on the target change-gear ratio, and controls the actuator such that the sheave position of either one of the primary movable sheave half and the secondary movable sheave half reaches the target sheave position.

9. A power unit comprising the transmission according to claim 1.

10. A vehicle comprising a power unit having a driving source and a transmission,
 wherein the transmission comprises:
  a change-gear mechanism having an input shaft connected to the driving source, an output shaft, and an actuator for changing a change-gear ratio between the input shaft and the output shaft;
  a centrifugal clutch connected to the output shaft;
  a control unit for controlling the actuator; and
  an output shaft rotational speed sensor for detecting a rotational speed of the output shaft and outputting the rotational speed of the output shaft to the control unit, and
 the control unit controls the actuator according to a target change-gear ratio obtained by dividing a target rotational speed of the input shaft by the rotational speed of the output shaft.

11. The vehicle according to claim 10, further comprising:
 a throttle opening sensor for detecting a throttle opening; and
 a vehicle speed sensor for detecting a vehicle speed,
 wherein the control unit determines the target rotational speed of the input shaft based on the throttle opening and the vehicle speed.

12. A controller for a transmission comprising:
 a change-gear mechanism having an input shaft, an output shaft, and an actuator for changing a change-gear ratio between the input shaft and the output shaft;
 a centrifugal clutch connected to the output shaft;
 a control unit for controlling the actuator; and
 an output shaft rotational speed sensor for detecting a rotational speed of the output shaft, wherein the actuator is controlled according to a target change-gear ratio obtained by dividing a target rotational speed of the input shaft by the rotational speed of the output shaft.

13. A method for controlling a transmission comprising a change-gear mechanism having an input shaft, an output shaft, and an actuator for changing a change-gear ratio between the input shaft and the output shaft; a centrifugal clutch connected to the output shaft; a control unit for controlling the actuator; and an output shaft rotational speed sensor for detecting a rotational speed of the output shaft, the method comprising:

controlling the actuator according to a target change-gear ratio obtained by dividing a target rotational speed of the input shaft by the rotational speed of the output shaft.

* * * * *